United States Patent [19]

Tersch

[11] 4,038,730
[45] Aug. 2, 1977

[54] POT BROACH RINGS

[75] Inventor: Richard W. Tersch, Grosse Pointe Woods, Mich.

[73] Assignee: Lear Siegler, Inc., Santa Monica, Calif.

[21] Appl. No.: 654,928

[22] Filed: Feb. 3, 1976

Related U.S. Application Data

[60] Continuation-in-part of Ser. No. 262,289, June 13, 1972, which is a continuation of Ser. No. 85,508, Oct. 30, 1970, abandoned, which is a division of Ser. No. 851,208, Aug. 19, 1969, Pat. No. 3,553,909.

[51] Int. Cl.² .............................................. B23P 15/42
[52] U.S. Cl. .................................................. 29/95.1
[58] Field of Search ........................................ 29/95.1

[56] References Cited
U.S. PATENT DOCUMENTS

| 3,332,129 | 7/1967 | Psenka | 29/95.1 |
| 3,755,867 | 9/1973 | Anthony | 29/95.1 |

Primary Examiner—Leonidas Vlachos
Attorney, Agent, or Firm—Whittemore, Hulbert & Belknap

[57] ABSTRACT

Pot broach rings having the trailing side specially modified to provide for regrinding both on the face and I.D. without producing a rearwardly facing interference shoulder in assembly.

2 Claims, 10 Drawing Figures

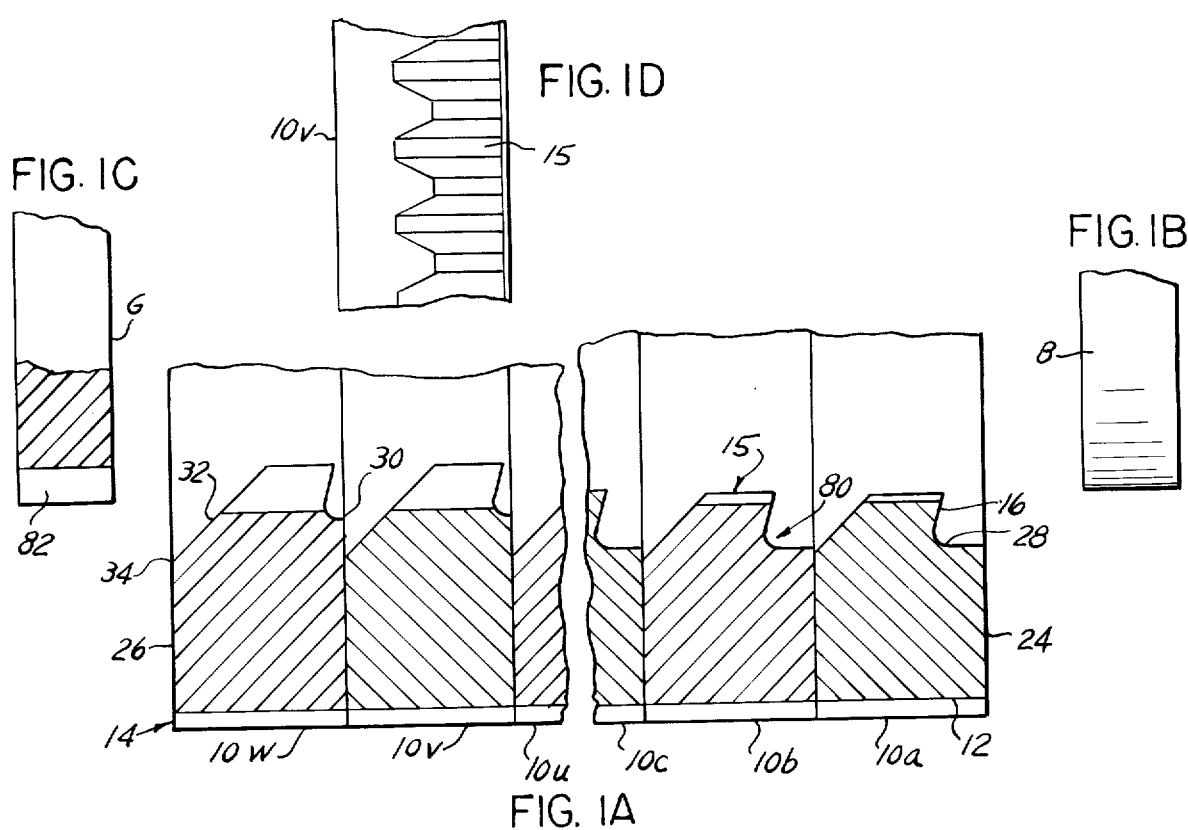
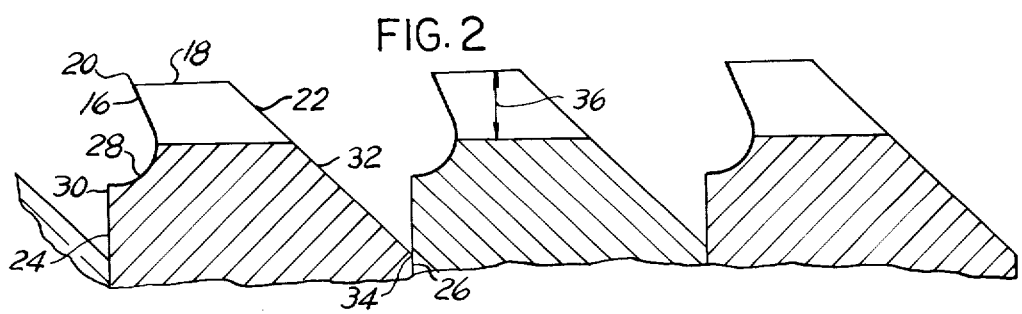
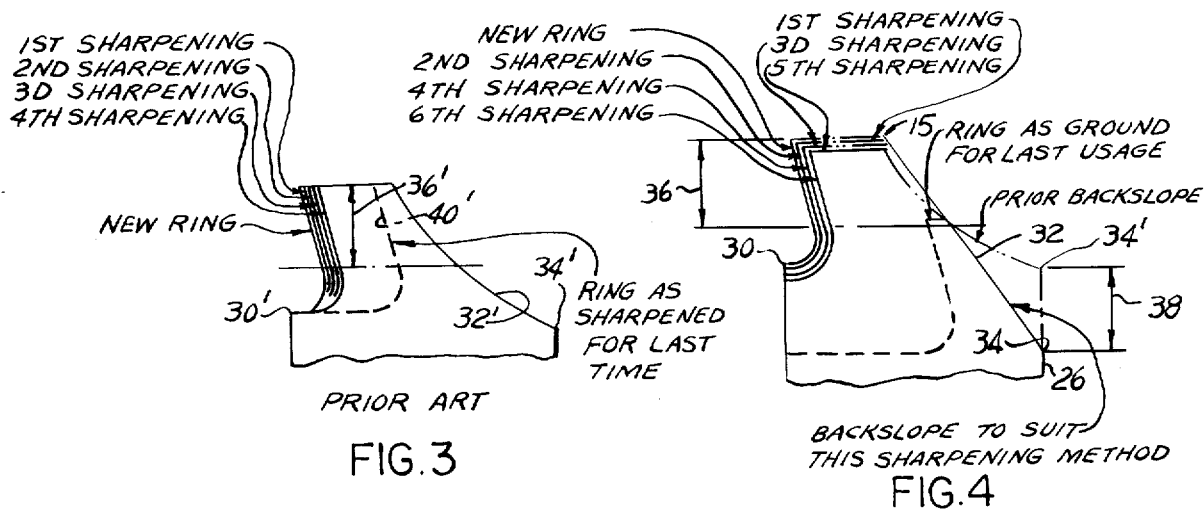

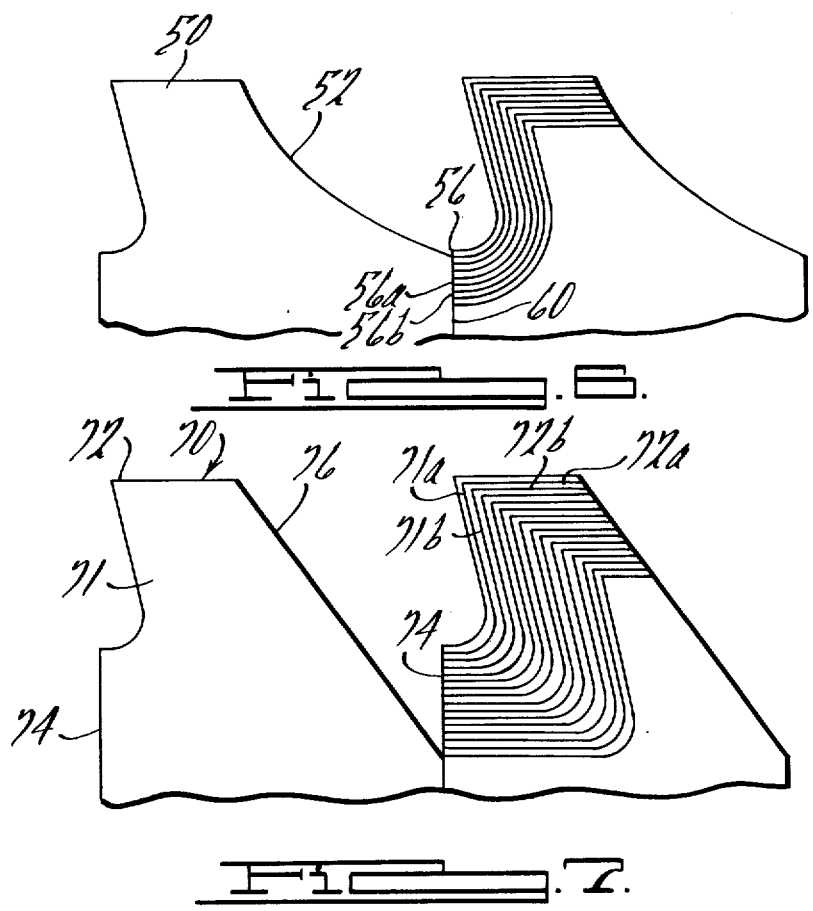

POT BROACH RINGS

CROSS-REFERENCE TO RELATED APPLICATIONS

The present application is a Continuation-in-Part of my copending application Ser. No. 262,289, filed June 13, 1972; which in turn is a Continuation of my prior application Ser. No. 85,508, filed Oct. 30, 1970 (now abandoned); which in turn was a Division of my prior application Ser. No. 851,208, filed Aug. 19, 1969 (now U.S. Pat. No. 3,553,909).

BRIEF SUMMARY OF THE INVENTION

Pot broaching of external gears employs a pot broach which usually comprises an assembly of annular broach rings each of which has a single series of internal cutting teeth. The outer surfaces of the rings are cylindrical and of identical size and are provided with accurately positioned locating keyways to insure assembly of the broach rings with the teeth in properly aligned position.

It has been the practice in the past to resharpen the rings when they have become dulled by face grinding the teeth. This has premitted a limited number of regrinds.

It will of course be appreciated that the teeth provided by successive rings are of increasing height or width, or both, in accordance with good broaching practice.

In accordance with the present invention the rings are designed so that they may be reground in accordance with a predetermined schedule on the faces of the teeth and on the I.D. For example, the face and I.D. grinds may be roughly alternated.

The amount of the I.D. grind is in each case sufficient to reduce the height of the teeth by the difference in height between a particular ring being ground and the ring which precedes it in the assembly. Thus, after each I.D. grind each ring may be advanced in the broach assembly to occupy the next preceding position. The broach ring at the leading end of the assembly will be discarded and a new broach ring will be positioned at the trailing end of the assembly, each of the intermediate rings being advanced one station toward the leading end of the broach.

BRIEF DESCRIPTION OF THE DRAWINGS

FIG. 1 is a longitudinal sectional view through a pot broach assembly.

FIG. 1A is a partly diagrammatic longitudinal section through an assembly of broach rings with parts broken away.

FIG. 1B is a fragmentary elevation of a portion of a cylindrical work blank in which teeth are to be cut, located in position in front of the leading broach ring.

FIG. 1C is a fragmentary elevational view, partly in section, of the work piece after it has passed through the broach showing the teeth formed thereon.

FIG. 1D is a fragmentary plan view indicating the presence of teeth on the broach rings shown in FIGS. 1A.

FIG. 2 is an enlarged fragmentary sectional view illustrating the tooth configuration at the I.D. of the broach rings.

FIG. 3 is an enlarged diagrammatic view illustrating prior practice.

FIG. 4 is a view similar to FIG. 3 illustrating the modified broach configuration.

FIG. 5 is a diagrammatic view illustrating the successive tooth shape following face sharpening.

FIG. 6 is a view similar to FIG. 5 showing the effect of face and I.D. sharpening without special tooth modification.

FIG. 7 is a diagrammatic view showing the effect of face and I.D. sharpening in conjunction with special tooth modification.

DETAILED DESCRIPTION

In pot broaching an external gear is produced by movement relative to an internal pot broach having progressively stepped teeth to cut full sized tooth spaces in a single pass. A broach of this type is illustrated in Psenka U.S. Pat. No. 3,322,129, which shows a holder made of two elongated parts having confronting recesses therein adapted to receive a multiplicity of broach rings.

In accordance with the present invention the pot broach is made up of an assembly of broach rings generally indicated at 10 but designated in FIG. 1 at 10a, 10b, 10c, 10u, 10v, and 10w. In practice the external surfaces of these broach rings are smooth cylindrical surfaces except for recesses 12 which when aligned constitute a longitudinally extending keyway indicated generally at 14. The broach rings are assembled in a holder and are located circumferentially by means of a key extending into the keyway 14.

The broach rings are provided at their interior with a circular series of cutting teeth 15. These teeth when new, and as provided at the rear of the assembly of teeth, have the configuration illustrated in FIG. 2. Each tooth is provided with a front surface 16 inclined to provide positive rake. The top surfaces 18 of the teeth are slightly inclined to provide cutting clearance in rear of the top cutting edge indicated at 20. The back surface of the teeth have back-slope as indicated at 22. The front of each ring includes a flat annular surface 24 and the rear of each ring includes a flat annular rear surface 26. In assembly, the broach rings are in abutment with the surface 24 and 26 in contact with the corresponding surfaces of adjacent rings.

At the front of each ring there is formed an annular concavely curved gullet 28 which intersects with the flat front surface 24 thereof at the point 30, this intersection defining a circle. The gullet 28 merges smoothly into the front surface of the teeth and constitutes a smooth continuous chip guiding surface.

Similarly, the rear of the broach ring is provided with a continuous inclined surface 32 of which the back-slope surface 22 of the teeth is an extension. The continuous conical surface 32 at the rear of each broach ring intersects as indicated at 34 with the flat rear surface 26 thereof. The intersection 34 defines a circle at the rear of the broach ring.

In accordance with the present invention the circle at the front of the trailing broach ring 10w provided by the intersection 30 is substantially smaller than the circle defined at the rear thereof by the intersection 34. In practice, as will subsequently appear, the difference in radii between the front and rear circles is approximately equal to the height of the teeth 15, this height being indicated in FIG. 2 as the dimension designated 36.

In FIG. 1A, the leading rings 10a, 19b, etc. are the result of repeated regrinding of rings as will subsequently appear.

Pot broach rings in accordance with prior usage have had the configuration diagrammatically illustrated in FIG. 3 where it will be observed that the difference in radii between the front circle formed by the intersection 30' and the rear circle formed by the intersection 34' is not great, the circle formed by intersection 30' beig somewhat smaller. Moreover, it will be observed that the rear of the broach is provided with a concave annular surface 32'.

This broach ring was designed for resharpening by a face grinding operation as indicated in FIG. 3, and in practice sufficient material was provided for a limited number of sharpenings such for example as 36.

Referring now to FIG. 4, the configuration of the tooth 15 constructed in accordance with the present invention is indicated. It will be understood that the broach ring illustrated in FIG. 4 is the broach ring intended for installation in the broach assembly at the trailing position so that the full sized teeth of the broach ring determine exactly the final shape and size of the teeth on a work piece. As best illustrated in this Figure, the rear concial surfaces 32 of the broach intersects the flat rear surface 26 thereof at the point 34 and this point is spaced radially outwardly from the point 34' which would be the location of the intersection of a broach ring constructed in accordance with prior practice by a dimension 38. It will also be observed that the location of the circle defined by the intersection 34 is spaced outwardly from the circle defined by the intersection 30 by an amount approximately equal to the full tooth depth 36, or the depth of tooth space or height of gear tooth to be cut.

If the prior art broach ring as illustrated in FIG. 3 were sharpened by generally alternated face and I.D. grinds to move the intersection between the flat front face 34 of the ring and the ground cutting face as indicated at 30' in FIG. 3 or 30 in FIG. 4, to be increased radius as shown in FIG. 4, while the rear surface of the ring was left with the back-slope 32' as illustrated in FIG. 3 and as further shown in dotted lines in FIG. 4, the result when assembling reground rings in the broach would be to produce a flat annular rearwardly facing shoulder constituted by the radially inner portion of the flat rear surface 26, which might interfere with free chip flow. This of course could be avoided when resharpening the broach rings by regrinding the rear side of the ring at each or after each few resharpenings. However, by forming the rear back-slope surface as illustrated at 32 in FIG. 4, the resharpening operation need be applied only to the face of the I.D. without requiring the additional setup necessary to regrind the back surface of the ring.

It will be understood from an inspection of FIG. 4 that this amounts to providing the inclined back-slope surface 32 so that it intersects the flat rear surface 26 of the ring at a circle having a radius which exceeds the radius of the circle formed by the intersection of the gullet with the flat front surface 34, when new, by an amount approximately equal to the increase in radius of the aforesaid circular intersection at the front face of the broach rings as a consequence of repeated I.D. regrinds throughout the life of the broach ring. Accordingly, the broach ring when given its final regrind will have the aforesaid circular intersections at both the front and rear surfaces thereof of approximately the same radius.

In a specific example a pot broach was provided employing 36 broach rings. As initially furnished these broach rings in general were of gradually increasing tooth height with respect to the surface being cut so that as the broach was passed over the work piece or the work piece was passed through the broach, successive broach rings took successive cuts to form the tooth spaces to the diameter determined by the dimensions of the teeth on the last broach ring or the last few broach rings if they are provided in an identical finishing set.

According to the prior practice, as best illustrated in FIG. 3, the broach rings are all sharpened by face sharpening and when material has been removed to the line designated 40' in FIG. 3, the broach rings are scrapped.

In accordance with the present invention, and in accordance with the specific example referred to, only the first set of rings supplied with the broach are of progressively larger tooth size. The resharpening operation in accordance with the present invention comprises substantially alternate face sharpening as indicated by the second, fourth and sixth sharpenings shown on the drawing, and I.D. grinding as shown by the first, third and fifth sharpenings on the drawing. In this case the I.D. grinding increases the I.D. of each broach ring to the dimension required for the preceding broach ring in the assembly. Accordingly, the leading broach ring is discarded and each I.D. ground broach ring is advanched to the preceding station and a new full size broach ring is provided at the rear of the assembly.

It is recognized that at different locations in the broach there may be variations in the amount of difference in tooth height between adjacent teeth. Accordingly, it will normally be desirable to provide a program indicating the sequence of sharpening operations as to face grinding or I.D. grinding and the amount of stock which is to be removed in each regrinding operation. For example, assuming that the stock removal for each face grinding operation is 0.0035 inch, it is found that the number of face grind sharpenings can be increased substantially. In one specific example where 36 face grind sharpenings, each removing 0.0035 inch and terminated when the land at the top of the tooth was reduced to 1/32 inch, only thirty-seven usages for the broach rings were permitted. However, when the broach rings are initially designed in accordance with the present invention and are sharpened or reground in accordance with the program disclosed herein, the number of face grindings is increased from 36 to 53, and in addition the broach rings as they are increased in I.D., may have 63 I.D. grinds, thus providing sixty-four additional usages. The total number of usages is thus increased from 37 to 118 for the broach ring positioned at the rear of the assembly.

Of course, the broach rings which were furnished new at the increased I.D. corresponding to intermediate positions in the broach assembly, will have a lesser number of usages. However, as the method is continued and new broach rings are supplied only to the rear of the broach assembly, eventually all broach rings will have the maximum increased number of usages.

FIGS. 5-7 are presented to illustrate more clearly the advantages obtained by the special tooth shape modification disclosed herein.

In FIG. 5 there are diagrammatically shown two teeth 50 and it will be observed that in new condition the back-slope of each tooth as indicated at 52, is a concave annular surface which meets the front surface 54 of the succeeding tooth at a point slightly below its outer corner 56. If teeth of this shape are successively resharpened by face grinding to give the successive profiles 58a, 58b, 58c, etc., it will be observed that there is no change in the relationship between the corner 56 on a following tooth and the back-slope surface 52 of the succeeding tooth and no chip interference results.

However, if unmodified teeth of the type presently provided on broach rings are alternatively face sharpened and I.D. sharpened and repositioned in the broach assembly as described herein, it will be observed that the corner 56 disappears on successive face grindings and corresponding shoulders are provided at 56a, 56b, etc. as regrinding proceeds. This will have the effect of causing the back flat surface 60 of the preceding broach tooth to constitute a shoulder against which chips curving along the front face of the teeth will lodge.

The present invention represents a specific modification over the teeth seen in FIGS. 5 and 6. The tooth is diagrammatically represented at 70 and in new condition has a front cutting face 71 and an I.D. surface 72. The broach rings each have flat annular faces 74 and are provided with inclined back-slope surfaces 76. These surfaces extend radially outwardly from the center of the broach substantially further than do the back-slope surfaces 52 of previously known broach rings. Accordingly, in new condition there is provided intermediate a pair of broach rings, a forwardly facing shoulder formed by the surface 74, but the exposed condition of this surface is not objectionable since the chips curve forwardly from each ring into engagement with the back-slope surface of the preceding tooth.

As the improved cutter broach rings of FIG. 7 are successively reground on the face to provide front cutting surfaces 71a, 71b, etc., and are alternatively ground on the I.D. to provide successive I.D. surfaces 72a, 72b, etc., the exposed forwardly facing shoulder provided by the flat radial surface 74 of each tooth disappears.

Referring again to FIG. 1 it will be observed that the series of broach rings commences with a ring 10a and extends through a large number as for example 65 rings to a trailing ring 10w. As in conventional practice a number of identical finishing or trailing rings 10w may be provided.

The front surface of each broach ring comprises a flat radially outer annular surface 24 and a generally concave radially inner annular surface, the outer portion of which is inwardly and rearwardly inclined to provide the front tooth surface 16 which as illustrated has a positive cutting rake due to the inclination thereof. The front tooth surface 16 merges smoothly into the continuous gullet 28 which constitutes a smooth continuous chip grinding surface.

It will be observed that the radially outer concave front surfaces, indicated in their entirety in FIGS. 1 and 2 by the reference character 80 have substantially the same radial dimension but are provided at progressively smaller radial distances from the axes of the broach rings.

On the other hand, it will be observed from these Figures that the broach rings have flat rear surfaces 26 and back-slope surfaces 32 all of which intersect with flat rear surfaces 26 of the broach rings at the same radial distance from the axis of the series of broach rings.

It will of course be understood that intermediate the leading ring 10a and the trailing ring 10w, all of the teeth are of progressively smaller internal diameter so that as the work piece B passes through the broach or as the broach passes over a work piece, the successive aligned teeth cut the tooth space to greater and greater depth to finally form gear teeth 82 as seen in FIG. 1 C.

Accordingly, the front faces of all the broach rings are seen to have concave annular surfaces of substantially identical radial width extending radially outwardly from the interior diameter thereof, which surfaces are curved forwardly to intersect the flat front sides thereof to provide positive cutting rake and to form smoothly curved chip guiding gullets. The crests of the teeth of successive rings have uniformly decreasing radial spacing from the axes thereof from front to rear of the series of rings to provide for cutting tooth spaces in a work piece to predetermined depth determined by the difference in radial spacing of the tooth crests between the leading and trailing rings of the series. The concave annular surfaces at the front of said rings have corresponding uniformly decreasing radial spacing from the axes of the series of rings from front to rear thereof. In addition, all of the rings have inclined back-slopes extending from the inside diameter of the rings corresponding to the crests of the teeth and intersecting the flat rear surface thereof at the same radial spacing from the axes thereof, independent of the internal diameter of said ring, when all teeth have been reground.

In FIG. 1A the leading broach ring 10a is indicated with the cross-sectional shape which it will have when such ring is provided by successive regrinding of rings previously positioned rearwardly of its leading position. When a new set of rings is furnished, the leading ring corresponding to the ring 10a may be identical with that shown in the Figure, or it may differ in that the front face of the teeth as indicated by the surface 16 may be positioned more closely adjacent the leading flat surface 24 of the ring, and of course the back-slope 32 at this time may if desired be provided so as to intersect the flat rear surface 26 of the ring at a point more closely adjacent its outside diameter. Again, the construction illustrated in FIG. 1A represents the cross-sectional shape of rings after insertion of new rings in the trailing position 10w and regrinding of the rings both on face and I.D. to produce the configuration of the ring illustrated at 10a in FIG. 1A.

Stated somewhat differently, it will be observed that all of the broach rings have front circles defined by the intersection between the annular concave surface at the front of each ring with the flat front surface 24 thereof. It will be observed from FIG. 1A that the front circles as defined herein are of decreasing radius from the leading broach ring 10a to the trailing broach ring 10w.

At the same time, the intersection between the inclined surface 32 (forming an extension of the back-slope 22 of the broach teeth) intersects the flat back surface of each broach ring in a back circle, the location of which is designated in FIG. 1A as at 34.

As previously indicated, the assembly of broach rings illustrated in FIG. 1A represents the condition of the broach rings after they have been reground sufficiently to advance a ring from the trailing position 10w to the leading position 10a. In this Figure it will be observed that the back circle as defined herein has a diameter approximately equal to the diameter of the front circle of the leading ring 10a. The requirement is that the diameter of the back circle be at least as great as the diameter of the front circle of the leading broach. The relationship between broach rings 10a and 10b is that the back circle of the leading broach ring 10a is slightly greater than the front circle of the next ring 10b.

So long as the diameter of the back circle is at least as great as the diameter of the front circle of the leading broach ring, the broach rings may be successively resharpened either by face or I.D. grinding without the necessity of modifying the back slope.

While the specific embodiment illustrated herein is of rings having internal teeth, it is obvious that externally toothed rings or discs might be similarly employed to form an external broach.

What I claim as my invention is:

1. A broach comprising a series of rings, radially inwardly extending teeth at the interior of said rings, said rings having flat front and rear sides adapted to abut in assembly, said rings having identically dimensioned exterior cylindrical surfaces provided with key-receiving recesses for receiving an aligning key, the front faces of all of said rings having concave annular surfaces of substantially identical radial width extending radially outwardly and rearwardly from the interior diameter thereof and curved forwardly to intersect the flat front sides thereof to define a front circle, to provide positive cutting rake and to form smoothly curved chip guiding gullets.

the crests of the teeth of successive rings having uniformly decreasing radial spacing from the axes thereof from front to rear of the series of rings to provide for cutting tooth spaces in a work piece to a predetermined depth determined by the difference in radial spacing of the tooth crests between the leading and trailing rings of said series, the concave surfaces at the front of said rings having corresponding uniformly decreasing radial spacing from the axes thereof from front to rear to define front circles of decreasing radius from front to rear, all of said rings having identical inclined back slopes forming a continuous annular surface of revolution extending from the inside diameter of said rings intersecting the flat rear surface thereof to define therewith back circles, the diameter of said back circles on all of said rings being at least as great as the diameter of the front circle at the front of the leading ring of said series.

2. A broach as defined in claim 1 in which the diameters of the rear circles are slightly larger than the front circle on the leading ring of said series.

* * * * *